United States Patent
Rost (10) Patent No.: US 10,989,232 B2
(45) Date of Patent: *Apr. 27, 2021

(54) CONTROL VALVE COMPENSATION SYSTEM

(71) Applicant: Rost Innovation LLC, Park Rapids, MN (US)

(72) Inventor: Alvin Stanley Rost, Park Rapids, MN (US)

(73) Assignee: Rost Innovation LLC, Park Rapids, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,908

(22) Filed: Aug. 15, 2019

(65) Prior Publication Data

US 2019/0368518 A1 Dec. 5, 2019

Related U.S. Application Data

(63) Continuation-in-part of application No. 15/268,777, filed on Sep. 19, 2016, now Pat. No. 10,385,884.

(Continued)

(51) Int. Cl.
*F15B 13/04* (2006.01)
*F15B 13/00* (2006.01)
*F16K 3/02* (2006.01)

(52) U.S. Cl.
CPC .......... *F15B 13/0418* (2013.01); *F15B 13/00* (2013.01); *F15B 13/0417* (2013.01);
(Continued)

(58) Field of Classification Search
CPC .... F15B 11/163; F15B 13/0418; F15B 13/00; F15B 13/0417; Y10T 137/5283
See application file for complete search history.

(56) References Cited

U.S. PATENT DOCUMENTS

| | | | | |
|---|---|---|---|---|
| 879,768 | A | ‡ 2/1908 | Hensel | B01J 19/0046 204/15 |
| 4,519,420 | A | ‡ 5/1985 | Petro | F15B 13/0417 137/269 |

(Continued)

OTHER PUBLICATIONS

PCT Search Report and Written Opinion Received from the International Searching Authority; Printed Dec. 12, 2016.‡

(Continued)

*Primary Examiner* — Kevin L Lee
(74) *Attorney, Agent, or Firm* — Neustel Law Offices (57) ABSTRACT

A Control Valve Compensation System for producing both a pre-compensated and a post-compensated load sensing hydraulic directional control valve module, wherein both configurations use the same components except for a sliding compensating component. The Control Valve Compensation System generally includes a hydraulic directional control valve housing which is adapted to be easily-interchangeable between a load sensing pre-compensated pressure configuration and a load sensing post-compensated pressure configuration by simply removing and replacing a different compensator assembly within the housing. The compensator assembly is adapted to direct oil flow through the housing while simultaneously providing compensation for the valve function. Directional valve assemblies may be provided, with the valve assemblies functioning to provide post-compensated functions, pre-compensated functions, and mixed pre- and post-compensated functions. These directional valve functions can be re-configured in the field by simply swapping the compensator assemblies to produce the desired functionality of the end-user at that particular time.

19 Claims, 9 Drawing Sheets

Related U.S. Application Data (60) Provisional application No. 62/220,350, filed on Sep. 18, 2015.

(52) U.S. Cl.
CPC . *F15B 13/0405* (2013.01); *F15B 2211/30575* (2013.01); *F16K 3/0272* (2013.01); *Y10T 137/5283* (2015.04)

(56) References Cited

U.S. PATENT DOCUMENTS

| | | | | | |
|---|---|---|---|---|---|
| 4,693,272 | A | ‡ | 9/1987 | Wilke | F15B 13/0417 137/596 |
| 5,025,625 | A | ‡ | 6/1991 | Morikawa | E02F 3/42 137/59 |
| 5,279,121 | A | ‡ | 1/1994 | Barber | F15B 11/162 137/59 |
| 5,279,131 | A | | 1/1994 | Barber | |
| 5,305,789 | A | ‡ | 4/1994 | Rivolier | F15B 13/0417 137/59 |
| 5,466,064 | A | ‡ | 11/1995 | Hudson | B01F 5/06 137/50 |
| 6,119,967 | A | ‡ | 9/2000 | Nakayama | B02C 21/02 241/34 |
| 6,895,852 | B2 | ‡ | 5/2005 | Pieper | E02F 9/2225 60/422 |
| 7,182,097 | B2 | ‡ | 2/2007 | Busani | F15B 13/01 137/59 |
| 7,770,592 | B2 | ‡ | 8/2010 | Knight | F16K 49/002 137/1 |
| 7,770,596 | B2 | ‡ | 8/2010 | Christensen | E02F 9/2267 137/59 |
| 7,818,966 | B2 | ‡ | 10/2010 | Pack | F15B 11/163 60/422 |
| 7,854,115 | B2 | ‡ | 12/2010 | Pack | E02F 9/2225 60/422 |
| 8,191,579 | B2 | ‡ | 6/2012 | Imhof | G05D 7/0133 137/62 |
| 8,381,757 | B2 | ‡ | 2/2013 | Remus | B62D 5/075 137/118.02 |
| 8,479,768 | B2 | ‡ | 7/2013 | Kunz | F15B 13/015 137/59 |
| 9,200,647 | B2 | ‡ | 12/2015 | Jadhav | F15B 13/0417 |
| 10,385,884 | B2 | * | 8/2019 | Rost | F16K 31/124 |
| 2013/0112297 | A1 | ‡ | 5/2013 | Jadhav | F15B 13/0417 137/56 |
| 2014/0026985 | A1 | ‡ | 1/2014 | Aranovich | F15B 13/0405 137/45 |

OTHER PUBLICATIONS

PCT International Search Report and Written Opinion for PCT/US2016/52473.

\* cited by examiner
‡ imported from a related application

CONTROL VALVE COMPENSATION SYSTEM

CROSS REFERENCE TO RELATED APPLICATIONS

The present application is a continuation of U.S. application Ser. No. 15/268,777 filed on Sep. 19, 2016, now U.S. Pat. No. 10,385,884, which claims priority to U.S. Provisional Application No. 62/220,350 filed Sep. 18, 2015. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a Control Valve Compensation System for producing both a pre-compensated and a post-compensated load sensing hydraulic directional control valve module, wherein both configurations use the same components except for a sliding compensating component.

Related Art

Any discussion of the related art throughout the specification should in no way be considered as an admission that such related art is widely known or forms part of common general knowledge in the field.

Control valves are widely used throughout a variety of industries. Hydraulic directional control valves are generally constructed to comprise either a pre-compensated configuration or a post-compensated configuration. In a pre-compensated configuration, module priority is provided by the control valve. In a post-compensated configuration, multiple modules are utilized to share the pump flow proportionally. Other desired functionality is accomplished by adding control components or logic controls adapted to control the sliding main component of the module.

Because of the inherent problems with the related art, there is a need for a new and improved Control Valve Compensation System for producing both a pre-compensated and a post-compensated load sensing hydraulic directional control valve module, wherein both configurations use the same components except for a sliding compensating component.

SUMMARY

An example embodiment of the present invention is directed to a Control Valve Compensation System for producing both a pre-compensated and a post-compensated load sensing hydraulic directional control valve module, wherein both configurations use the same components except for a sliding compensating component. Such configurations allow manufacturers of such valves to reduce costs, such as manufacturing tooling costs and manufacturing testing costs. The present invention also aids with increasing inventory turn numbers. Each of the control valve systems disclosed herein are adapted to covert from pre-compensated to post-compensated, or vice versa, by simply changing a sliding compensating component.

There has thus been outlined, rather broadly, some of the embodiments of the Control Valve Compensation System in order that the detailed description thereof may be better understood, and in order that the present contribution to the art may be better appreciated. There are additional embodiments of the Control Valve Compensation System that will be described hereinafter and that will form the subject matter of the claims appended hereto. In this respect, before explaining at least one embodiment of the Control Valve Compensation System in detail, it is to be understood that the Control Valve Compensation System is not limited in its application to the details of construction or to the arrangements of the components set forth in the following description or illustrated in the drawings. The Control Valve Compensation System is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Turning now descriptively to the drawings, in which similar reference characters denote similar elements throughout the several views, FIGS. 1 through 10 illustrate a Control Valve Compensation System, which comprises a hydraulic directional control valve housing 11, 12 which is adapted to be easily-interchangeable between a load sensing pre-compensated pressure configuration and a load sensing post-compensated pressure configuration by simply removing and replacing a different compensator assembly within the housing. The compensator assembly is adapted to direct oil flow through the housing 11, 12 while simultaneously providing compensation for the valve function. Directional valve assemblies may be provided, with the valve assemblies functioning to provide post-compensated functions, pre-compensated functions, and mixed pre- and post-compensated functions. These directional valve functions can be re-configured in the field by simply swapping the compensator assemblies to produce the desired functionality of the end-user at that particular time.

B. Pre-Compensated Configuration

Figure 1:
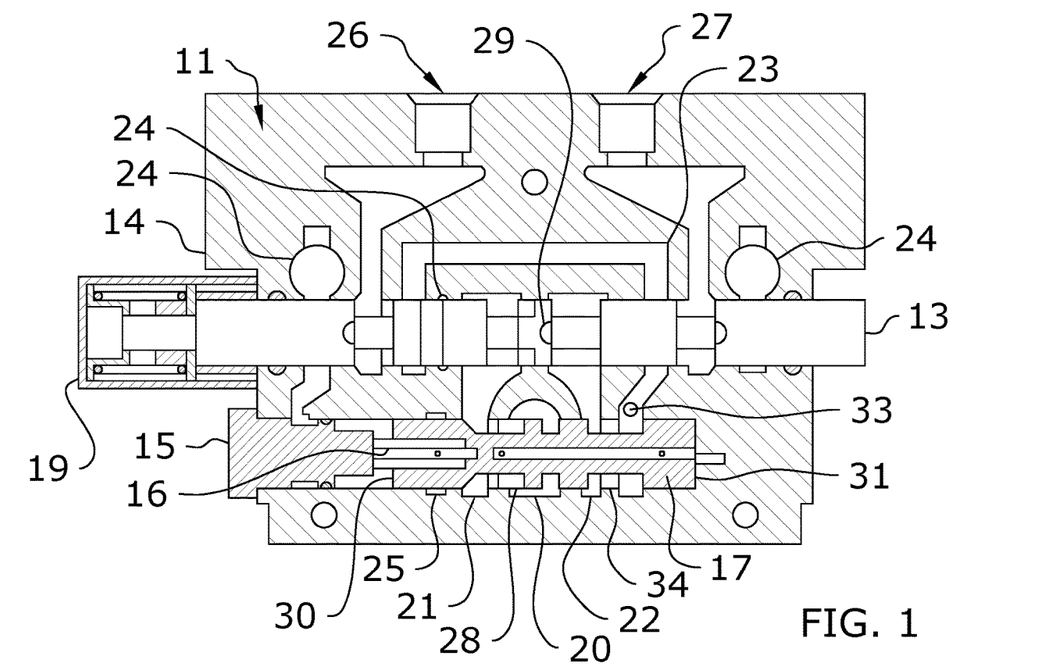
FIG. 1 is a sectional view of a first embodiment of a pre-compensated configuration of the present invention.
Figure 2:
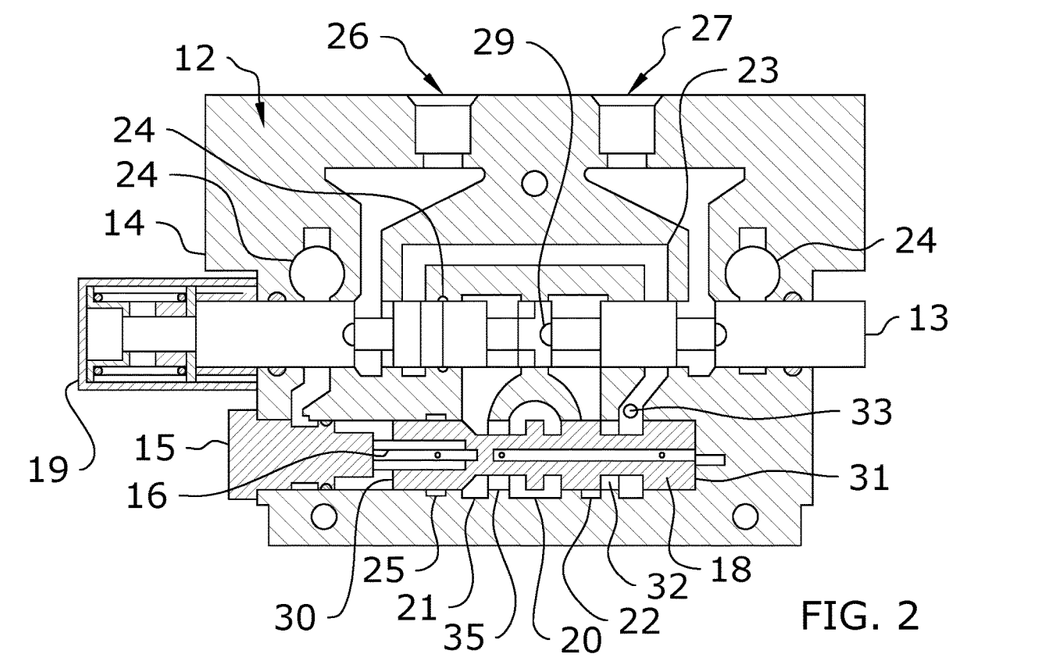
FIG. 2 is a sectional view of a first embodiment of a post-compensated configuration of the present invention.
Figure 3:
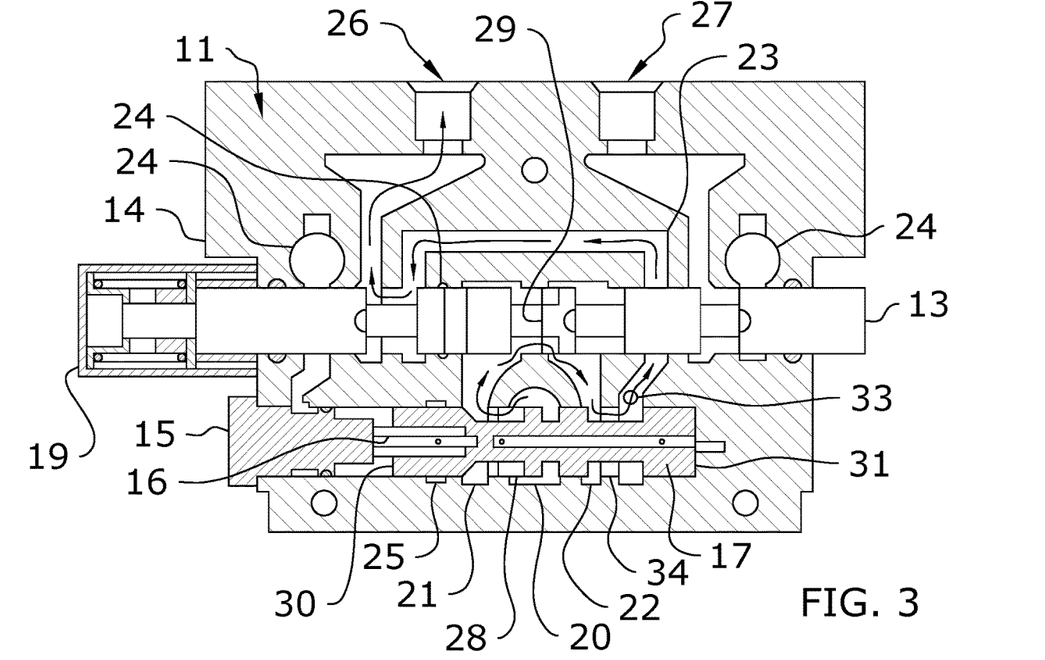
FIG. 3 is a sectional view of a first embodiment of a pre-compensated configuration of the present invention in a working position.
Figure 4:
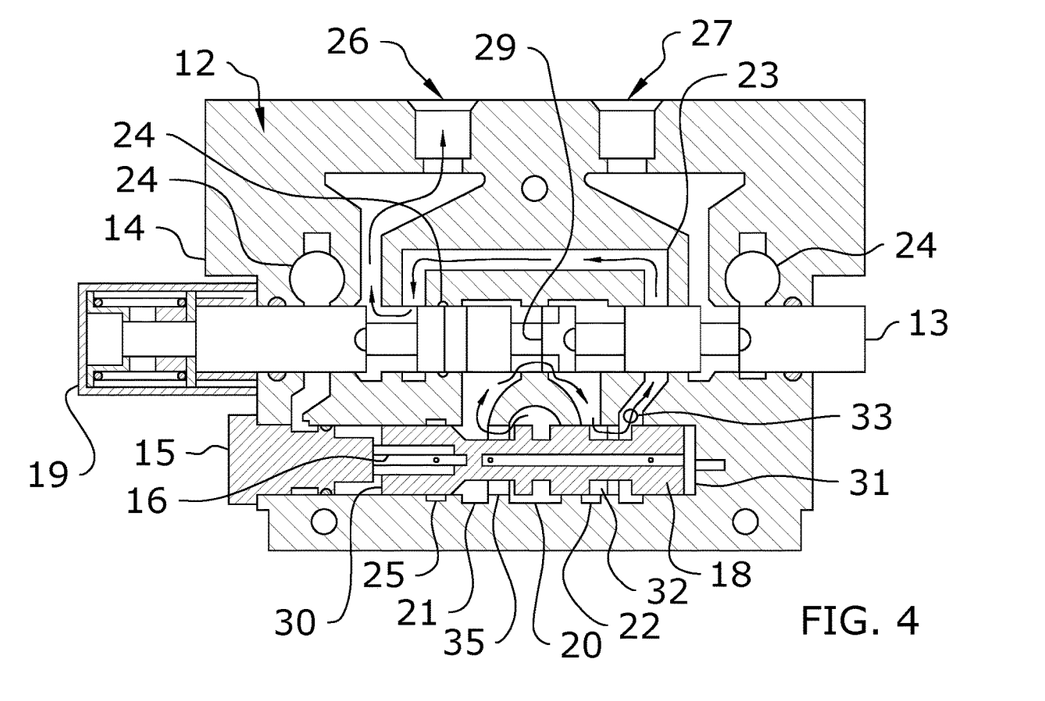
FIG. 4 is a sectional view of a first embodiment of a post-compensated configuration of the present invention in a working position.
Figure 5:
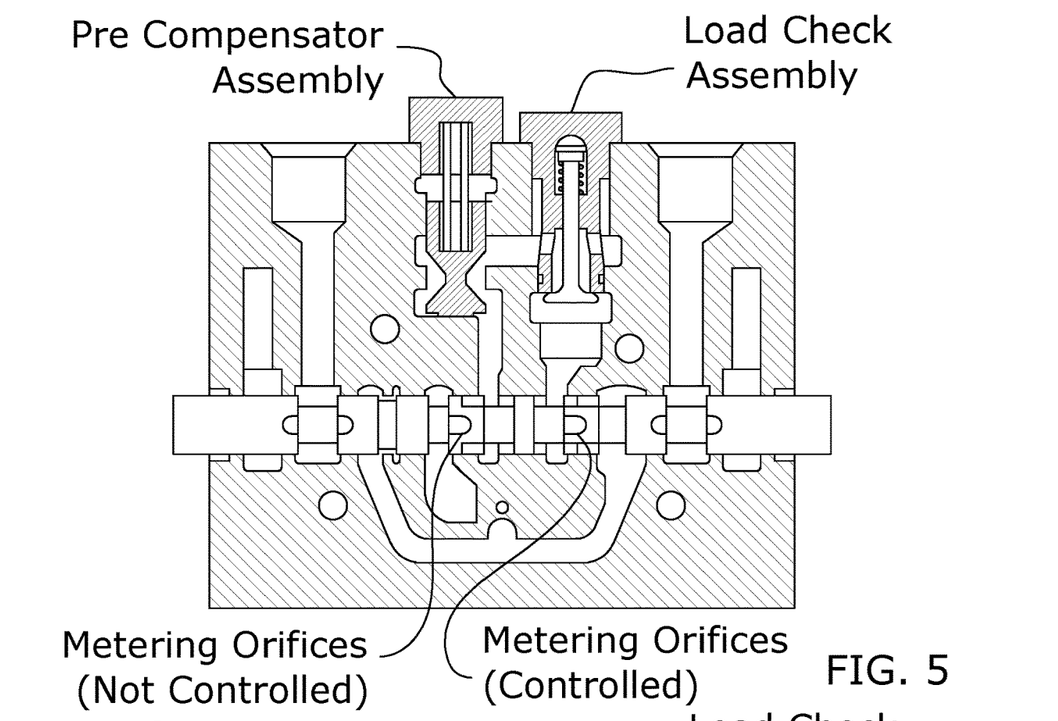
FIG. 5 is a sectional view of a second embodiment of a pre-compensated configuration of the present invention.
Figure 7:
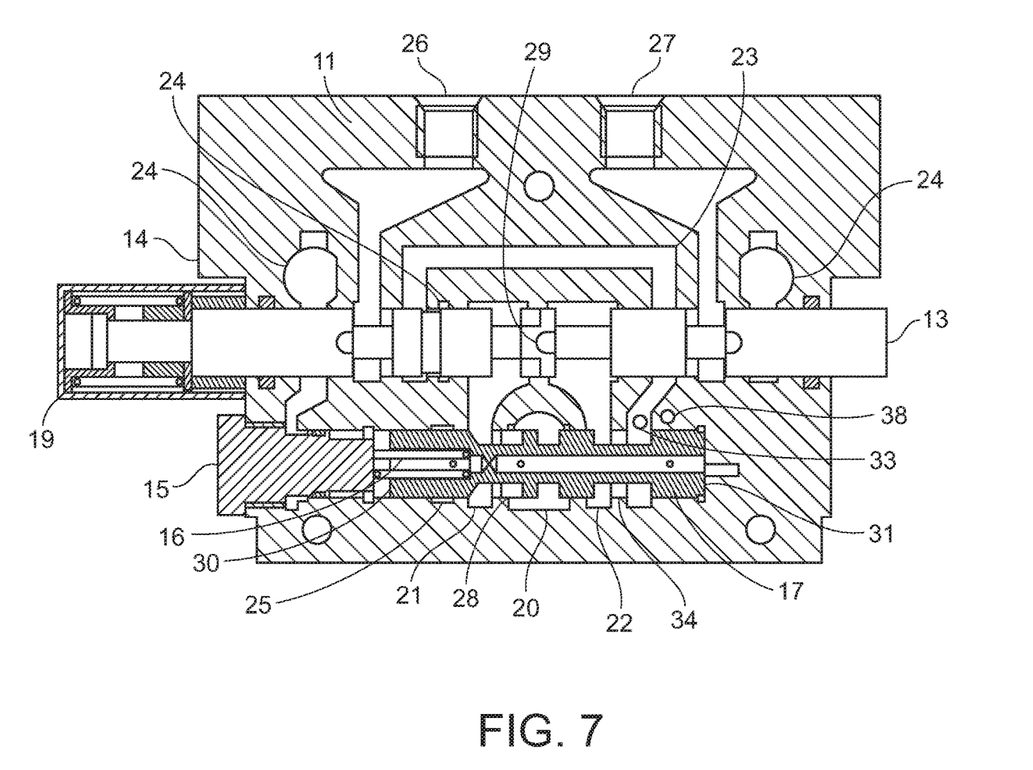
FIG. 7 is a sectional view of a third embodiment of a pre-compensated configuration of a control valve compensation system in accordance with an example embodiment.
Figure 9:
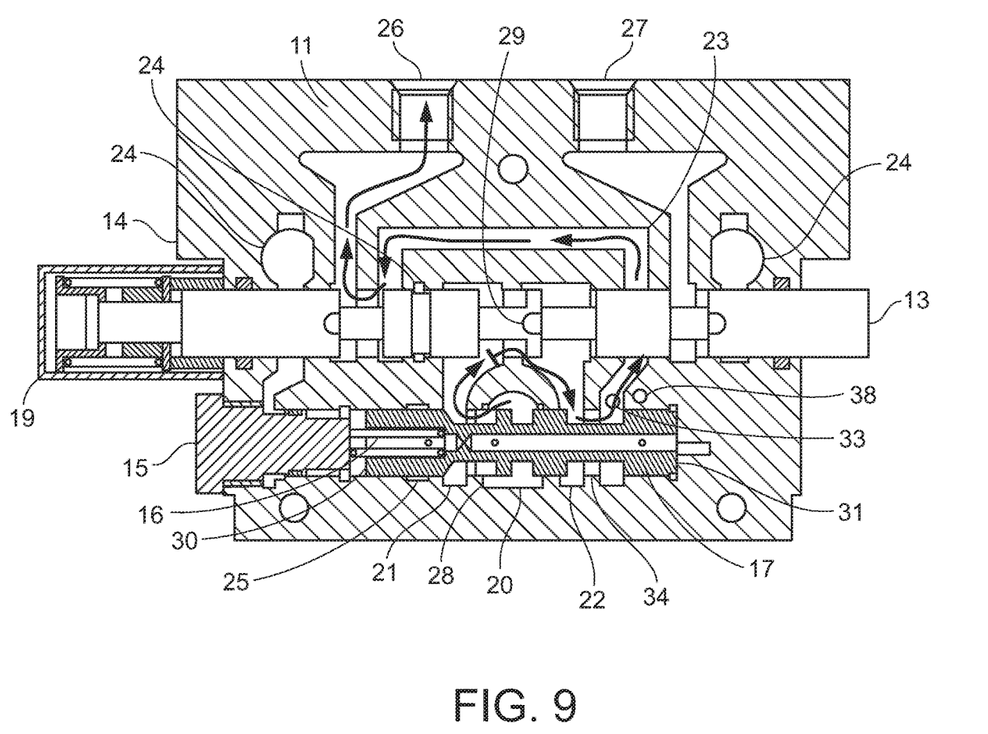
FIG. 9 is a sectional view of a third embodiment of a pre-compensated configuration of a control valve compensation system in a working position in accordance with an example embodiment.

FIGS. 1, 3, 5, 7, and 9 illustrate different embodiments of the present invention configured for pre-compensation. FIG. 1 illustrates the pre-compensation configuration. FIG. 3 illustrates the pre-compensation configuration in a work position. FIG. 5 illustrates an alternate embodiment of the pre-compensation configuration in which the compensator is positioned perpendicular with respect to the main control unit. FIG. 7 illustrates another embodiment of the pre-compensated configuration. FIG. 9 illustrates another embodiment of the pre-compensated configuration in a work position.

As shown in FIGS. 1, 3, 7, and 9 the pre-compensated configuration comprises a valve body 14 with a plurality of internal flow passageways 20, 21, 22, 23, 24, 26, 27. It should be noted that the number, configuration, orientation, and types of passageways 20, 21, 22, 23, 24, 26, 27 utilized may vary in different embodiments of the present invention. In the exemplary embodiment shown in the figures, these include a power passageway 20, a first intermediate passageway 21, a second intermediate passageway 22, a loop passage 23, one or more return passages 24, and a plurality of work ports 26, 27. Passage 25 is an artificial pressure that has been reduced from the power passage 20 in the inlet cover.

Figure 11:
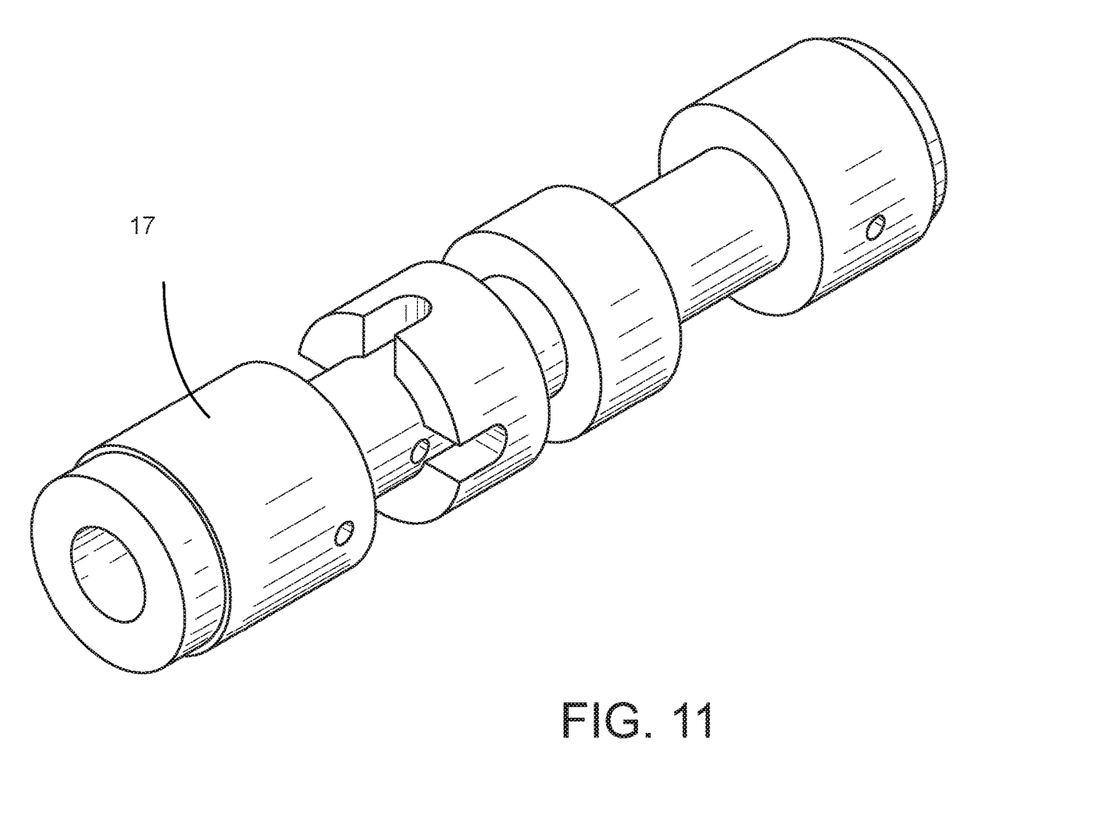
FIG. 11 is a perspective view of an exemplary pre-compensator spool for use with a control valve compensation system in accordance with an example embodiment.

The pre-compensated configuration further comprises a selectable valve spool 13. Various types of spools may be utilized, and the types of spools shown in the figures should not be construed as limiting on the scope of the present invention. The selectable valve spool 13 may include a plurality of control notches 29. A pre-compensator piston 17 is provided which may include a compensating aperture 28. FIG. 11 is a perspective view of an exemplary pre-compensator piston 17. The spring 16 shown in the figures is generally biased to be normally open in the pre-compensated configuration.

When the selectable valve spool 13 is positioned toward a first side of the housing 11 (i.e. to the right side as shown in the figures), fluid will flow from the power passage 20 across the compensator piston 17 and pre-compensator control aperture 28 into the first intermediate passage 21. After the first intermediate passage 21, the fluid will continue onward to the selectable valve spool 13 and across the selectable valve spool notches 29 into the second intermediate passage 22. From the second intermediate passage 22, the fluid flows by the compensator piston 17 at undercut 34 and into the loop passage 23, where the selectable valve spool 13 directs fluid through a passage into the powered work port 26.

At all times during fluid flow, the compensator piston 17 ends 30, 31 are adapted to sense pressure, such as power passageway 20 pressure on end 31 through a sensing compensator passage internally. Power passage pressure on end 31 is measured internally through the compensator 17 and reduced pressure on end 30 is measure internally through the compensator 17 from the artificial pressure passage 25. By balancing the pressure on the compensator piston end 31 with the pressure on the compensator end 30 and the biasing spring 16, fine metering may be provided for the selectable valve spool 13 and control notches 29.

Returning fluid from the working function enters the work port 27, enters the body passage 27, and flows across the control notches to the return passage 24. Reversing the position of the selectable valve spool 13 to the second side of the housing (i.e. to the left side as shown in the figures) reverses the flows inside the valve powering the opposite work port 27 and returning to the opposite work port 26.

FIGS. 1, 3, 7, and 9 illustrate usage of a load sense passage 33 placed within the direction of flow. FIGS. 7 and 9 illustrate an additional load sensing passage thru 38 positioned horizontally and vertically offset with respect to the load sense passage 33.

C. Post-Compensated Configuration

Figure 6:
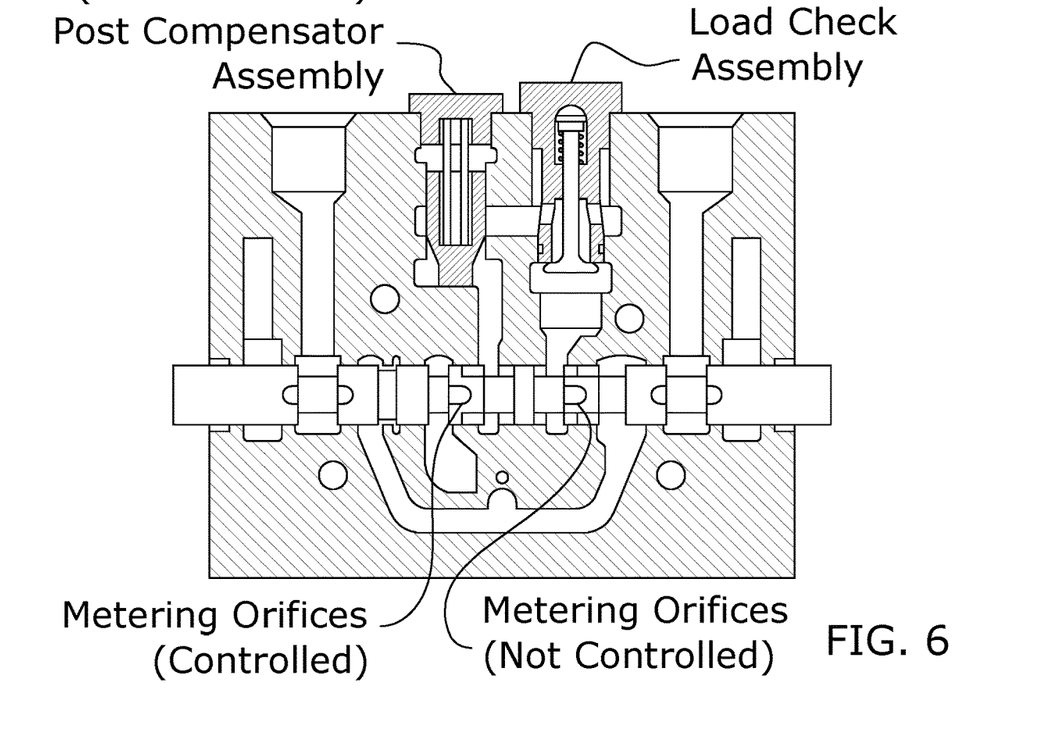
FIG. 6 is a sectional view of a second embodiment of a post-compensated configuration of the present invention.
Figure 8:
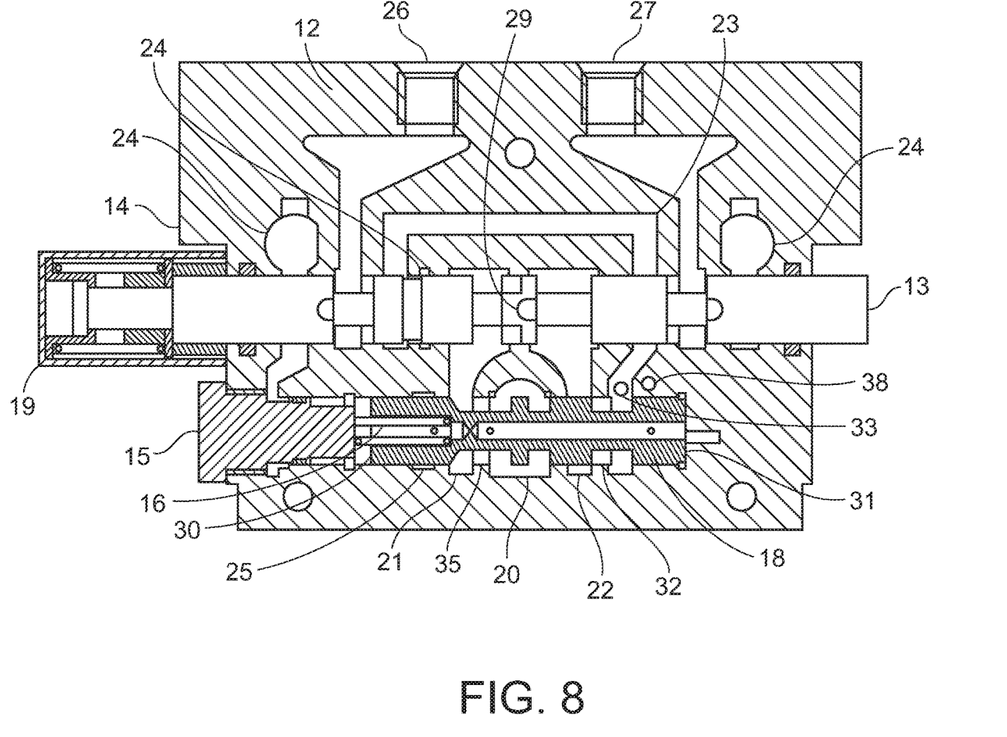
FIG. 8 is a sectional view of a third embodiment of a post-compensated configuration of a control valve compensation system in accordance with an example embodiment.
Figure 10:
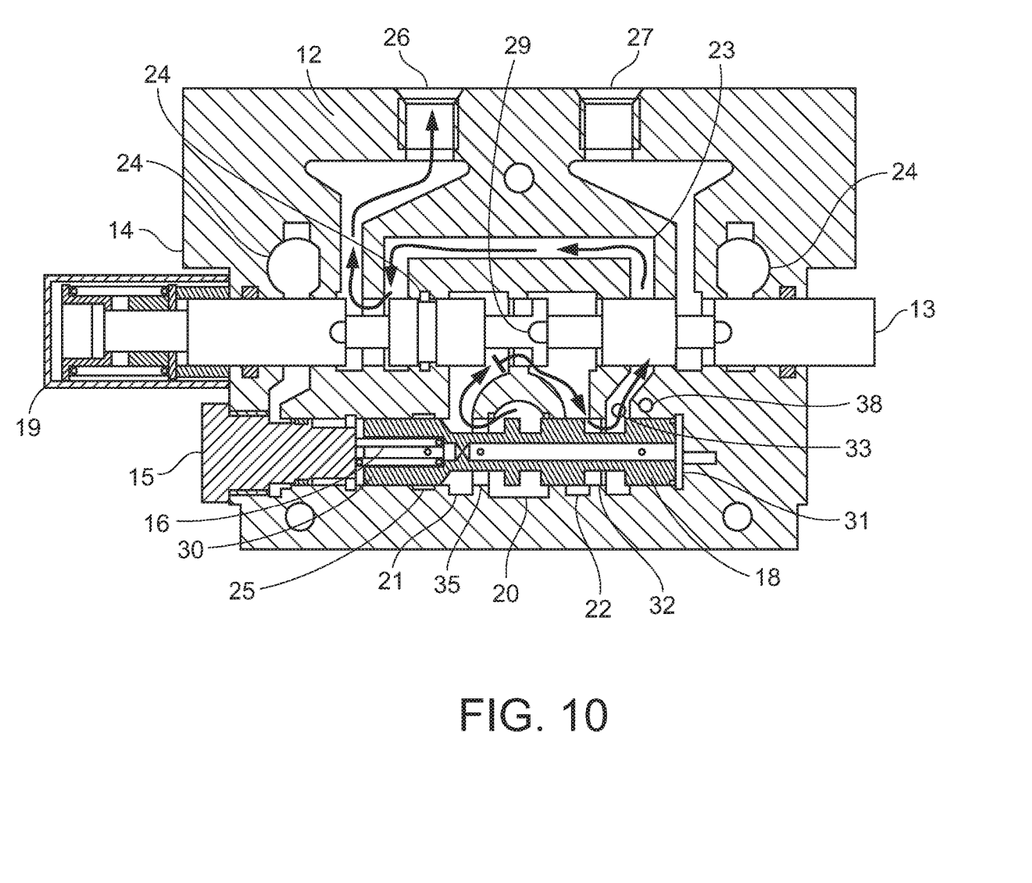
FIG. 10 is a sectional view of a third embodiment of a post-compensated configuration of a control valve compensation system in a working position in accordance with an example embodiment.

FIGS. 2, 4, 6, 8, and 10 illustrate different embodiments of the present invention configured for post-compensation. FIG. 1 illustrates the post-compensation configuration. FIG. 3 illustrates post-compensation configuration in a work position. FIG. 6 illustrates an alternate embodiment of the post-compensation configuration in which the compensator is positioned perpendicular with respect to the main control unit. FIG. 8 illustrates another embodiment of a post-compensation configuration. FIG. 10 illustrates another embodiment of a post-compensation configuration in a work position.

As shown in FIGS. 2, 4, 8, and 10, the post-compensated configuration comprises a valve body 14 with a plurality of internal flow passageways 20, 21, 22, 23, 24, 26, 27. It should be noted that the number, configuration, orientation, and types of passageways 20, 21, 22, 23, 24, 26, 27 utilized may vary in different embodiments of the present invention. In the exemplary embodiment shown in the figures, these include a power passageway 20, a first intermediate passageway 21, a second intermediate passageway 22, a loop passage 23, one or more return passages 24, and a plurality of work ports 26, 27.

Figure 12:
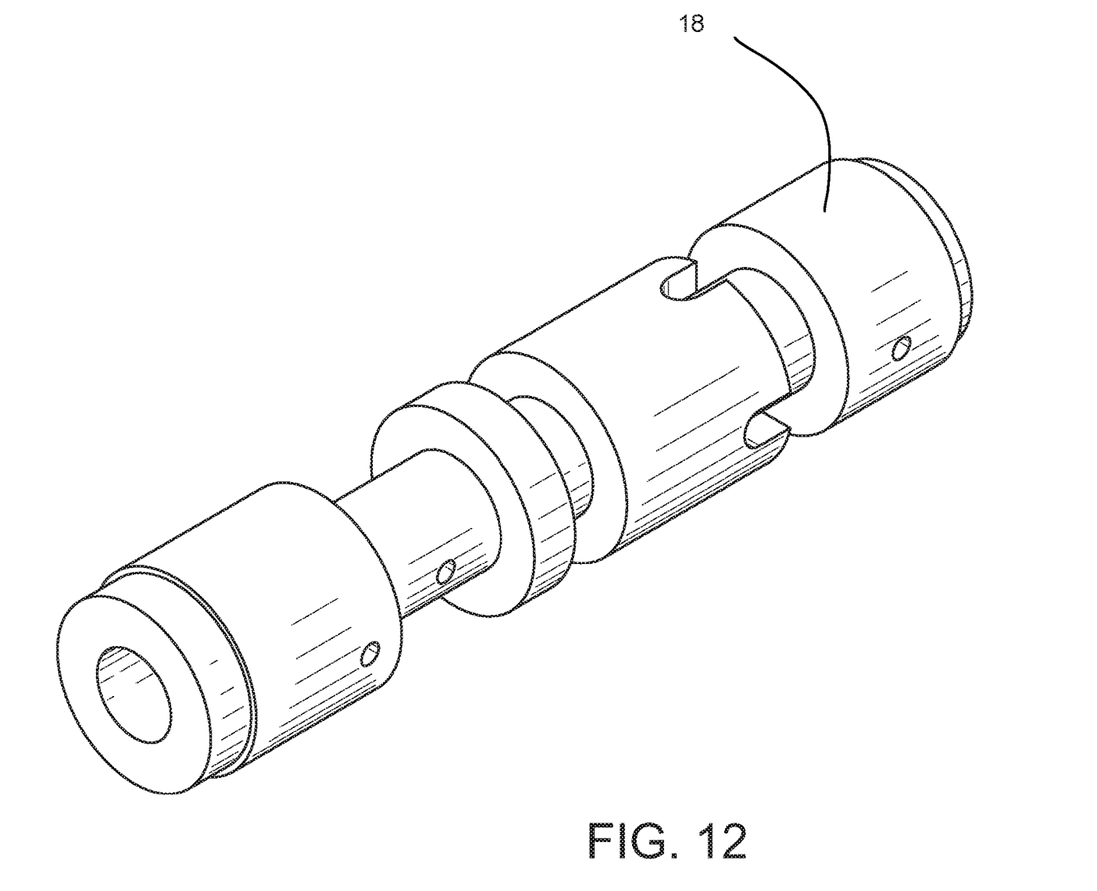
FIG. 12 is a perspective view of an exemplary post-compensator spool for use with a control valve compensation system in accordance with an example embodiment.

The post-compensated configuration further comprises a selectable valve spool 13. Various types of spools may be utilized, and the types of spools shown in the figures should not be construed as limiting on the scope of the present invention. The selectable valve spool 13 may include a plurality of control notches 29. A post-compensator piston 18 is provided which may include a post-compensator control aperture 32. FIG. 12 is a perspective view of an exemplary embodiment of a post-compensator piston 18. The spring 16 shown in the figures is generally biased to be normally closed in the post-compensated configuration 12.

When the selectable valve spool 13 is positioned toward a first side of the housing (i.e. to the right side as shown in the figures), fluid flows from the power passage 20, across the compensator piston 18 at undercut 35 and into the first intermediate passage 21. From there, the fluid flows onto the selectable valve spool 13 and across the selectable valve spool notches 29 into the second intermediate passage 22. From the second intermediate passage 22, the fluid flows by the compensator piston 18 and compensating aperture 32 into the loop passage 23, where the selectable valve spool 13 directs fluid into a passageway to the powered work port 26.

At all times during fluid flow, the compensator piston 18 ends 30, 31 sense multiple pressures. Power passage pressure on end 31 is measured internally through the compensator 18 and reduced pressure on end 30 is measure internally through the compensator 18 from the artificial pressure passage 25. By balancing the pressure on compensator piston 18 end 31 with the pressure on compensator 18 end 30 and the biasing spring 16, fine metering may be provided for the selectable valve spool 13 and control notches 29. Returning fluid from the working function enters work port 27, through an interconnected passageway 27, and flow across the control notches to the body return passage 24. Reversing the position of the selectable valve spool 13 toward the second side of the housing (i.e. to the left side as shown in the figures) reverses the flows inside the present invention powering the opposite work port 27 and returning to the opposite work port 26.

FIGS. 2, 4, 8, and 10 illustrate usage of a load sense passage 33 placed within the direction of flow. FIGS. 8 and 10 illustrate an additional load sensing passage thru 38 positioned horizontally and vertically offset with respect to the load sense passage 33.

D. Flow Control

Adjustment of the selectable valve spool 13 may be utilized to control flow of the fluid through the valve body 14, with the selectable valve spool 13 being operable to control flow of the fluid through the valve body 14. Adjustment of the selectable valve spool 13 may reverse flow of the fluid through the valve body 14. By way of example, the selectable valve spool 13 may be adjustable between a first position and a second position, wherein when the selectable valve spool 13 is in the first position the fluid within the valve body 14 flows in a first direction and when the selectable valve spool 13 is in the second position the fluid within the valve body flows in a second direction. The first position may be at or near a first side of the valve body 14 and the second position may be at or near a second side of the valve body 14.

E. Alternate Embodiments

It should be appreciated that various aspects of the present invention may be altered in different embodiments of the present invention. For example, actuators may be utilized to control the sliding directional control component 13 of the modules. The actuators may be controlled in various manners, including electrically, hydraulically, pneumatically, or by computer logic to have the modules function in desired modes.

FIGS. 5 and 6 illustrate an alternate embodiment of both the pre-compensated configuration 11 and the post-compensated configuration 12. While FIGS. 1-4 illustrate an embodiment in which the compensator is parallel to the main control component, FIGS. 5-6 illustrate an embodiment in which the compensator is perpendicular to the main control component. In the latter embodiment, the compensator controls only one set of metering orifices and does not bypass any flow in the flow stream. The post-compensator controls the upstream metering orifices and the pre-compensator controls the downstream orifices. In such an embodiment, the compensator assemblies are still interchangeable for desired module functionality.

Unless otherwise defined, all technical and scientific terms used herein have the same meaning as commonly understood by one of ordinary skill in the art to which this invention belongs. Although methods and materials similar to or equivalent to those described herein can be used in the practice or testing of the Control Valve Compensation System, suitable methods and materials are described above. All publications, patent applications, patents, and other references mentioned herein are incorporated by reference in their entirety to the extent allowed by applicable law and regulations. The Control Valve Compensation System may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A control valve compensation system, comprising:
   a valve body comprising a plurality of internal flow passageways and a plurality of work ports;
   a selectable valve spool adjustably positioned within the valve body, the selectable valve spool being operable to control flow of a fluid through the valve body, wherein the selectable valve spool is adjustable between a first position and a second position;
   a pre-compensation assembly removably positioned within the valve body, wherein the valve body is adapted to function as a pre-compensated valve when the pre-compensation assembly is positioned within the valve body; and
   a post-compensation assembly removably positioned within the valve body, wherein the valve body is adapted to function as a post-compensated valve when the post-compensation assembly is positioned within the valve body.

2. The control valve compensation system of claim 1, wherein the pre-compensation assembly is parallel with respect to the selectable valve spool when the pre-compensation assembly is positioned within the valve body.

3. The control valve compensation system of claim 2, wherein the post-compensation assembly is parallel with respect to the selectable valve spool when the post-compensation assembly is positioned within the valve body.

4. The control valve compensation system of claim 1, wherein the pre-compensation assembly is perpendicular with respect to the selectable valve spool when the pre-compensation assembly is positioned within the valve body.

5. The control valve compensation system of claim 4, wherein the post-compensation assembly is perpendicular with respect to the selectable valve spool when the post-compensation assembly is positioned within the valve body.

6. The control valve compensation system of claim 1, wherein the selectable valve spool comprises a plurality of control notches.

7. The control valve compensation system of claim 1, wherein the pre-compensation assembly comprises a pre-compensation piston.

8. The control valve compensation system of claim 7, wherein the pre-compensation piston comprises a pre-compensation aperture.

9. The control valve compensation system of claim 8, wherein the pre-compensation assembly comprises a pre-compensation spring.

10. The control valve compensation system of claim 9, wherein the pre-compensation spring is biased to be open absent application of force.

11. The control valve compensation system of claim 1, wherein the post-compensation assembly comprises a post-compensation piston.

12. The control valve compensation system of claim 11, wherein the post-compensation piston comprises a post-compensation aperture.

13. The control valve compensation system of claim 12, wherein the post-compensation assembly comprises a post-compensation spring.

14. The control valve compensation system of claim 13, wherein the post-compensation spring is biased to be closed absent application of force.

15. The control valve compensation system of claim 1, wherein adjustment of the selectable valve spool reverses flow of the fluid through the valve body.

16. The control valve compensation system of claim 1, wherein when the selectable valve spool is in the first position the fluid within the valve body flows in a first direction.

17. The control valve compensation system of claim 16, wherein when the selectable valve spool is in the second position the fluid within the valve body flows in a second direction.

18. The control valve compensation system of claim 17, wherein the first position is at a first side of the valve body.

19. The control valve compensation system of claim 18, wherein the second position is at a second side of the valve body.

* * * * *